United States Patent
Vij et al.

(10) Patent No.: US 11,663,723 B2
(45) Date of Patent: May 30, 2023

(54) IMAGE SEGMENTATION SYSTEM

(71) Applicant: Snap Inc., Santa Monica, CA (US)

(72) Inventors: Shubham Vij, Los Angeles, CA (US); Menglei Chai, Los Angeles, CA (US); David LeMieux, Hermosa Beach, FL (US); Ian Wehrman, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 183 days.

(21) Appl. No.: 17/249,445

(22) Filed: Mar. 2, 2021

(65) Prior Publication Data

US 2021/0192744 A1 Jun. 24, 2021

Related U.S. Application Data

(63) Continuation of application No. 16/365,228, filed on Mar. 26, 2019, now Pat. No. 10,964,023.

(51) Int. Cl.
| | | |
|---|---|---|
| *G06T 7/11* | (2017.01) | |
| *G06F 3/04845* | (2022.01) | |
| *G06T 7/194* | (2017.01) | |
| *G06T 7/13* | (2017.01) | |
| *G06T 7/12* | (2017.01) | |
| *G06T 7/174* | (2017.01) | |
| *G06V 10/56* | (2022.01) | |

(52) U.S. Cl.
CPC ............ *G06T 7/11* (2017.01); *G06F 3/04845* (2013.01); *G06T 7/12* (2017.01); *G06T 7/13* (2017.01); *G06T 7/174* (2017.01); *G06T 7/194* (2017.01); *G06V 10/56* (2022.01); *G06T 2207/20104* (2013.01); *G06T 2207/20132* (2013.01)

(58) Field of Classification Search
None
See application file for complete search history.

(56) References Cited

U.S. PATENT DOCUMENTS

| | | |
|---|---|---|
| 9,396,354 B1 | 7/2016 | Murphy et al. |
| 9,681,265 B1 | 6/2017 | Davis et al. |
| 2006/0029275 A1 | 2/2006 | Li et al. |
| 2010/0202689 A1 | 8/2010 | Currivan et al. |
| 2011/0216965 A1 | 9/2011 | Rother et al. |
| 2011/0216976 A1 | 9/2011 | Rother et al. |
| 2012/0327172 A1 | 12/2012 | El-Saban et al. |
| 2013/0243308 A1 | 9/2013 | Yokono et al. |
| 2014/0164886 A1 | 6/2014 | Grieb et al. |
| 2015/0043806 A1 | 2/2015 | Karsch et al. |

(Continued)

OTHER PUBLICATIONS

"U.S. Appl. No. 16/365,228, Final Office Action dated Sep. 9, 2020", 9 pgs.

(Continued)

*Primary Examiner* — Jiangeng Sun
(74) *Attorney, Agent, or Firm* — Schwegman Lundberg & Woessner, P.A.

(57) ABSTRACT

An image segmentation system to perform operations that include causing display of an image within a graphical user interface of a client device, receive a set of user inputs that identify portions of a background and foreground of the image, identify a boundary of an object depicted within the image based on the set of user inputs, crop the object from the image based on the boundary, and generate a media item based on the cropped object, wherein properties of the media object, such as a size and a shape, are based on the boundary of the object.

20 Claims, 10 Drawing Sheets

(56) References Cited

U.S. PATENT DOCUMENTS

2015/0365795 A1 12/2015 Allen et al.
2016/0321708 A1 11/2016 Sehn

OTHER PUBLICATIONS

"U.S. Appl. No. 16/365,228, Non Final Office Action dated Aug. 3, 2020", 9 pgs.
"U.S. Appl. No. 16/365,228, Non Final Office Action dated Sep. 29, 2020", 9 pgs.
"U.S. Appl. No. 16/365,228, Notice of Allowance dated Dec. 1, 2020", 6 pgs.
"U.S. Appl. No. 16/365,228, Response filed Aug. 7, 2020 to Non Final Office Action dated Aug. 3, 2020", 11 pgs.
"U.S. Appl. No. 16/365,228, Response filed Sep. 16, 2020 to Final Office Action dated Sep. 9, 2020", 10 pgs.
"U.S. Appl. No. 16/365,228, Response filed Nov. 19, 2020 to Non Final Office Action dated Sep. 29, 2020", 12 pgs.

400

CAUSING DISPLAY OF AN IMAGE WITHIN A GRAPHICAL USER INTERFACE AT A CLIENT DEVICE, THE IMAGE COMPRISING IMAGE PROPERTIES THAT DEFINE A FOREGROUND PORTION OF THE IMAGE AND A BACKGROUND PORTION OF THE IMAGE
402

RECEIVING A FIRST USER INPUT THAT IDENTIFIES THE FOREGROUND PORTION OF THE IMAGE
404

RECEIVING A SECOND USER INPUT THAT IDENTIFIES THE BACKGROUND PORTION OF THE IMAGE
406

IDENTIFYING A BOUNDARY OF AN OBJECT DEPICTED IN THE IMAGE BASED ON THE FIRST USER INPUT AND THE SECOND USER INPUT, THE BOUNDARY COMPRISING A SET OF DIMENSIONS
408

CROPPING THE OBJECT FROM THE IMAGE BASED ON THE BOUNDARY OF THE OBJECT
410

GENERATING A MEDIA ITEM BASED ON THE OBJECT, THE MEDIA ITEM COMPRISING MEDIA PROPERTIES BASED ON THE SET OF DIMENSIONS OF THE BOUNDARY OF THE OBJECT
412

```
┌─────────────────────────────────────────────────────────────────┐
│  DETECTING A CONFLICT BETWEEN A FIRST REGION OF THE IMAGE       │
│  DEFINED BY THE FIRST USER INPUT AND A SECOND REGIONN OF THE    │
│ IMAGE DEFINED BY THE SECOND USER INPUT, THE CONFLICT INCLUDING  │
│   AN INTERSECTION BETWEEN THE FIRST REGION AND THE SECOND       │
│                           REGION                                │
│                            502                                  │
└─────────────────────────────────────────────────────────────────┘
                                │
                                ▼
┌─────────────────────────────────────────────────────────────────┐
│  SEGMENTING THE FIRST REGION INTO AT LEAST A FIRST SEGMENT AT A │
│    POINT OF THE INTERSECTION, THE FIRST SEGMENT COMPRISING AT   │
│              LEAST A PORTION OF THE FIRST REGION                │
│                            504                                  │
└─────────────────────────────────────────────────────────────────┘
                                │
                                ▼
┌─────────────────────────────────────────────────────────────────┐
│ SEGMENTING THE SECOND REGION INTO AT LEAST A SECOND SEGMENT     │
│   AT THE POINT OF INTERSECTION, THE SECOND SEGMENT COMPRISING   │
│            AT LEAST A PORTION OF THE SECOND REGION              │
│                            506                                  │
└─────────────────────────────────────────────────────────────────┘
                                │
                                ▼
┌─────────────────────────────────────────────────────────────────┐
│   IDENTIFYING THE BOUNDARY OF THE OBJECT BASED ON THE FIST      │
│              SEGMENT AND THE SECOND SEGMENT                     │
│                            508                                  │
└─────────────────────────────────────────────────────────────────┘
```

FIG. 5

IMAGE SEGMENTATION SYSTEM

CLAIM OF PRIORITY

This application is a continuation of U.S. patent application Ser. No. 16/365,228, filed on Mar. 26, 2019, which is incorporated herein by reference in its entirety.

TECHNICAL FIELD

Embodiments of the present disclosure relate generally to mobile computing technology and, more particularly, but not by way of limitation, to systems for performing image segmentation upon an image a client device.

BACKGROUND

Various multimedia editing tools to enable users to select objects or layers in images are among the most useful and widely used tools available for editors. Such applications generally require users to provide multiple, often painstakingly precise and detailed, inputs to define a border of an object within an image. As a result, such tools are not particularly user friendly for beginners, or users that may be operating devices with limited display screens.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of segmenting an object from an image, according to certain example embodiments.

FIG. 5 is a flowchart depicting a method of segmenting an object from an image, according to certain example embodiments.

DETAILED DESCRIPTION

Figure 1:
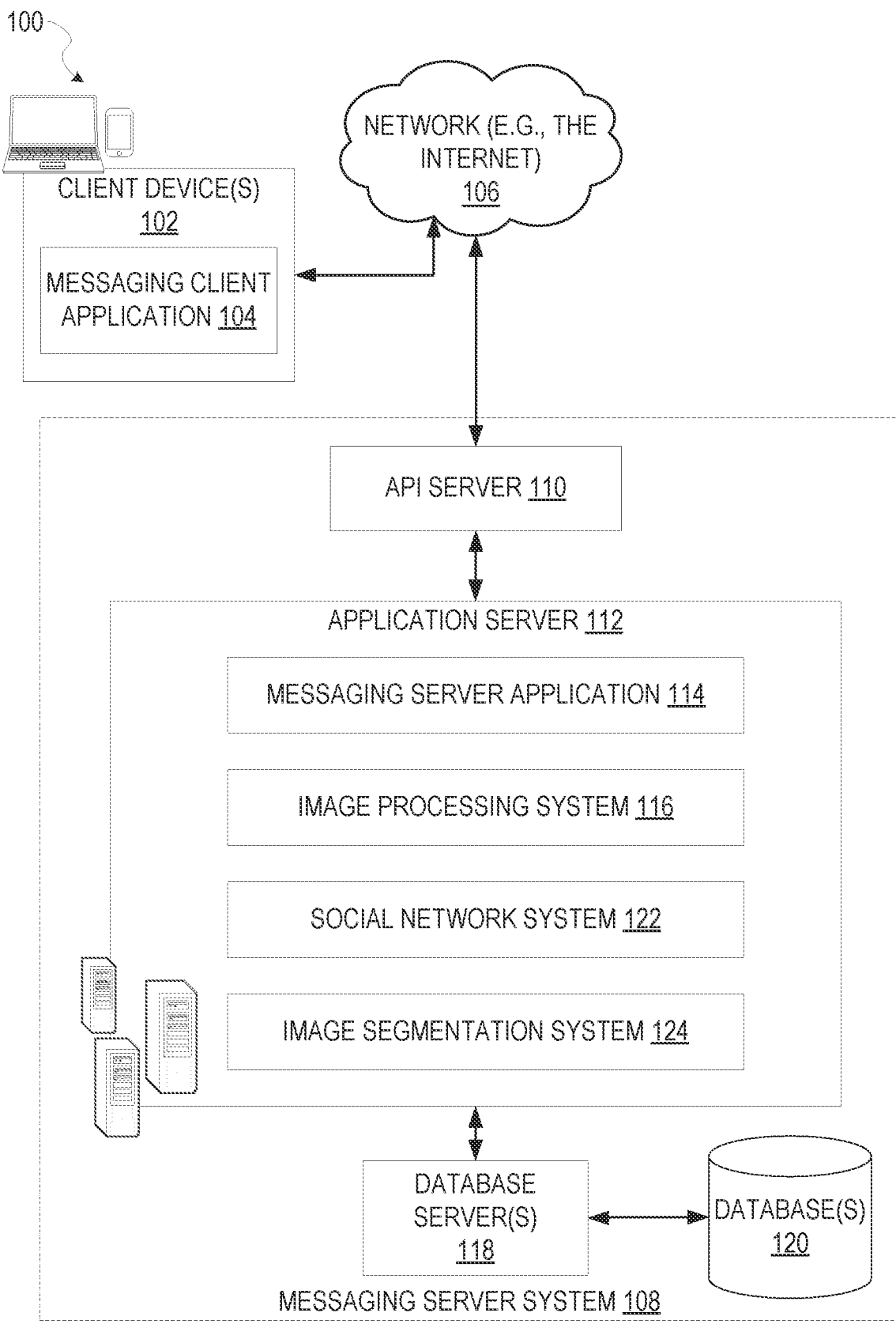
FIG. 1 is a block diagram showing an example messaging system for exchanging data (e.g., messages and associated content) over a network in accordance with some embodiments, wherein the messaging system includes a contextual filter system.

As discussed above, various multimedia editing tools to enable users to select objects or layers in images generally require users to provide precise and detailed inputs to select and segment objects from images. Due to the precision and skill required to accurately segment objects from images, these tools are inefficient and time consuming to use for beginners and users executing the multimedia tools through limited hardware, such as a touch screen of a mobile device. A system to enable users to accurately segment objects from images with fewer inputs would therefore be an improvement over existing technology.

Example embodiments described herein relate to an image segmentation system to segment objects from images based on simple user inputs. According to certain embodiments, the image segmentation system is configured to perform operations that include causing display of an image within a graphical user interface of a client device, receive a set of user inputs that identify portions of a background and foreground of the image, identify a boundary of an object depicted within the image based on the set of user inputs, crop the object from the image based on the boundary, and generate a media item based on the cropped object, wherein properties of the media object, such as a size and a shape, are based on the boundary of the object.

In some example embodiments, the user inputs that identify regions of the background and foreground of the image may include a first user input that identifies a region of the image within the foreground portion of the image and a second user input that identifies a region of the image within the background portion of the image. For example, the user inputs may include inputs that identify a set of pixels located in the background or foreground portions of the image. In such embodiments, the user input may include a stroke, or scribble, that draws a line like a brush stroke over a set of pixels within either the foreground or background portion of the image. For example, a user may provide an input selecting either a foreground stroke, or a background stroke, wherein the foreground stroke identifies the foreground portion of the image and the background stroke identified the background portion of the image.

In some embodiments, responsive to receiving the user inputs, the image segmentation system generates and causes display of a visual representation of the user input upon the image. For example, the user input may be represented visually as a stroke of paint over a region within the image as a tactile input into a touch enabled device, where the input corresponding to the foreground portion of the image is represented in a first color (e.g., blue), while the input corresponding to the background portion of the image is represented as a second color (e.g., red).

In instances where the background stroke and foreground stroke intersect one another, a conflict can be detected. Responsive to detecting a conflict between a background stroke and a foreground stroke, the image segmentation system identifies a point of intersection of the conflict, and segments the background stroke and foreground stroke, and identifies the boundary of the object depicted by the image based on the segmented background stroke and foreground stroke.

According to certain embodiments, responsive to generating the media item based on the cropped object, the image segmentation system saves the media item at a memory location associated with the client device, or a user account associated with the client device. For example, in some embodiments, the memory location may include a memory repository of the client device itself, while in further embodiments the memory repository may exist within a server system in communication with the client device.

Having saved the media item at the memory location associated with the client device, a user of the client device may access the media item at a later time. For example, the user may access a second image, select a point within the second image, and overlay the media item at a position based on the point selected in the second image, to generate a second media item. The user may distribute the second media item to one or more users through a message, such as an ephemeral message.

In some example embodiments, the image segmentation system may be implemented as a virtualized application, such that a portion of the image segmentation system is not installed at the client device. In such embodiments, the image segmentation system replace a portion of a runtime environment executed by the client device with a virtualization layer, wherein the virtualization layer intercepts operations of the image segmentation system and redirects them to a virtualized location. In this way, the client device may execute one or more of the operations of the image segmentation system through accessing a virtual resource (instead of a physical resource of the client device).

In some embodiments, the image segmentation system may be implemented such that only essential portions of the image segmentation system are installed at the client device, and wherein code to execute the image segmentation system by the client device are delivered over the network to the client device as and when they are needed. In such embodiments, the image segmentation system may be fully executed by the client device, but may be stored at a centralized storage location remote from the client device.

In further embodiments, one or more of the functions and operations performed above are executed by a system external to the client device itself, such that a user of the client device may access and execute an application configured to perform the one or more functions performed by the image segmentation through the client device.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity. Accordingly, in certain embodiments the image segmentation system 124 may be executed as a fully virtualized application, wherein a portion (but not necessarily all) of the image segmentation system 124 is installed at the client device 102, while the remainder of the code to execute the image segmentation system 124 is delivered to the client device 102 via a browser executed by the client device 102, and through the network 106, as and when it is required. Thus, a user of the client device 102 may execute the operations performed by the image segmentation system 124 through a browser, rather than installing the entirety of the image segmentation system 124 at the client device 102.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an image segmentation system 124. The image segmentation system 124 is configured to segment an image into foreground and background portions, and to identify boundaries of objects depicted within the image to crop the objects from the images and generate media items based on the cropped objects, according to some example embodiments. Further details of the image segmentation system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
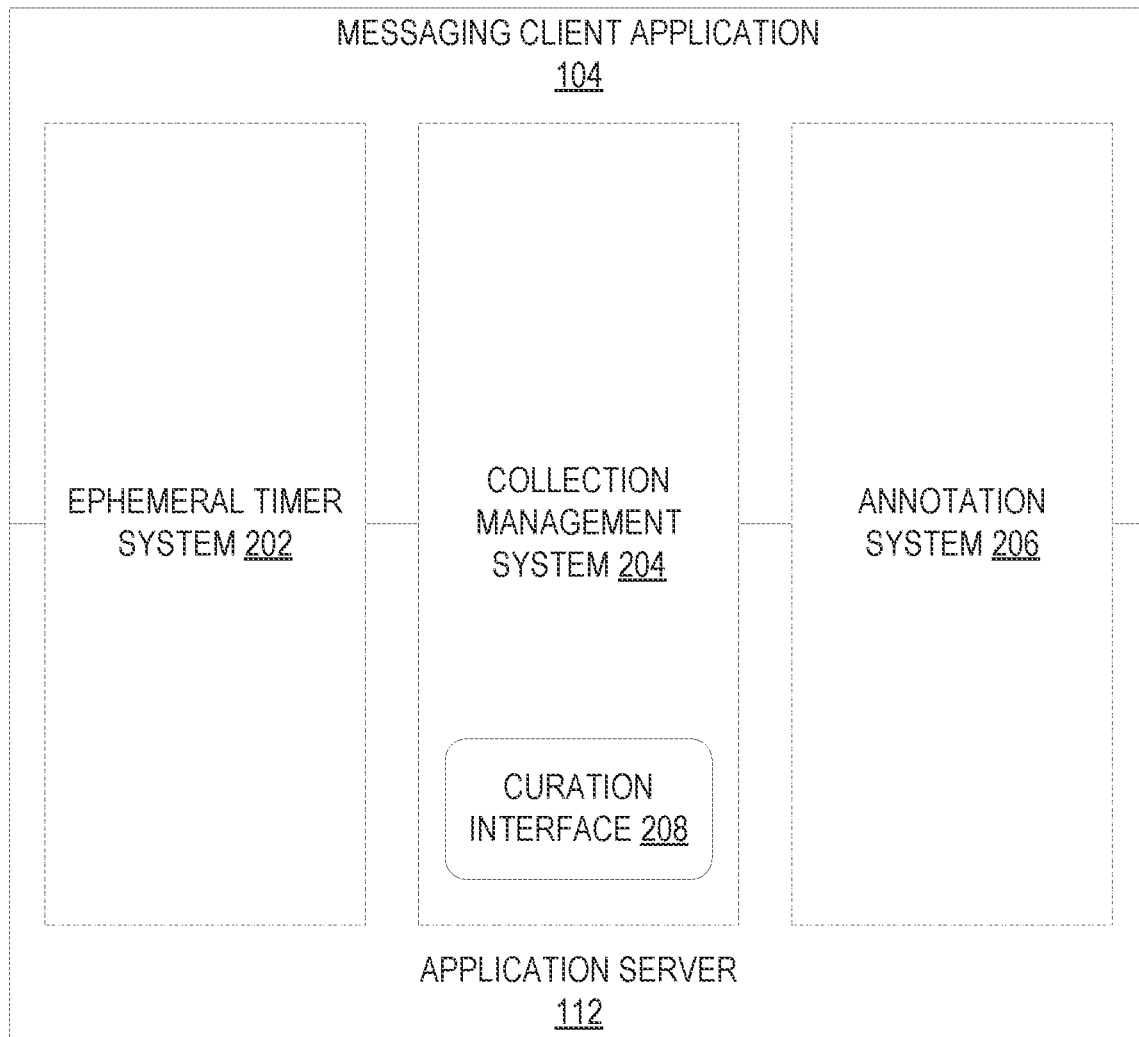
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the image segmentation system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
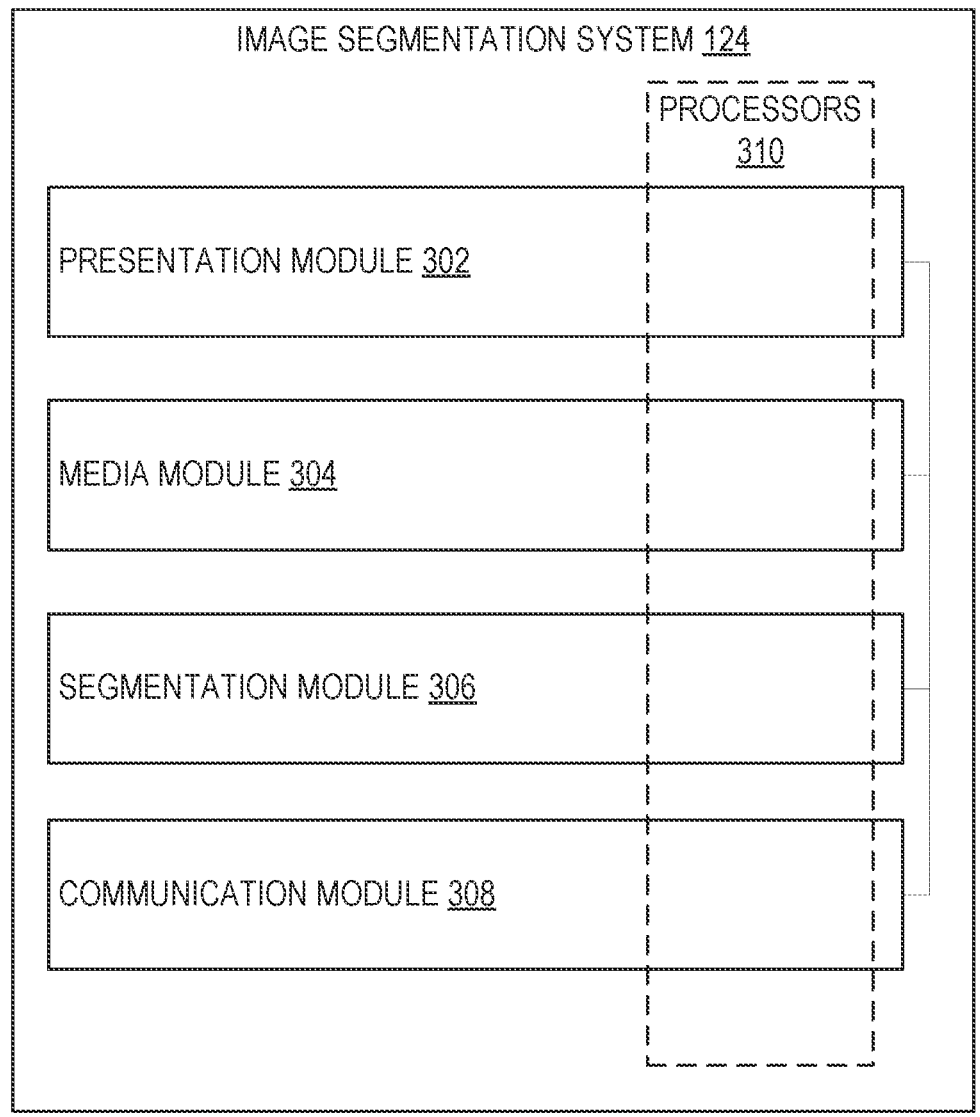
FIG. 3 is a block diagram illustrating various modules of a contextual filter system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the image segmentation system 124 that configure the image segmentation system 124 to perform operations to detect crop objects from images based on a limited set of inputs received from a user through a graphical user interface presented at a client device 102, according to some example embodiments.

The image segmentation system 124 is shown as including a presentation module 302, a media module 304, a segmentation module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the image segmentation system 124 may physically include an arrangement of one or more of the processors 310 (e.g., a subset of or among the one or more processors of the machine) configured to perform the operations described herein for that module. As another example, any module of the image segmentation system 124 may include software, hardware, or both, that configure an arrangement of one or more processors 310 (e.g., among the one or more processors of the machine) to perform the operations described herein for that module. Accordingly, different modules of the image segmentation system 124 may include and configure different arrangements of such processors 310 or a single arrangement of such processors 310 at different points in time. Moreover, any two or more modules of the image segmentation system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

According to certain example embodiments, one or more of the modules of the image segmentation system 124 may be accessed by the client device 102 through a browser and executed by the client device 102 as a virtualized application through a virtualization layer executed at the client device 102. The processors 310 may therefore include a combination of one or more processors of the client device 102 itself, and one or more processors executing at the application server 112.

FIG. 4 is a flowchart depicting a method 400 of segmenting an object from an image, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the presentation module 302 causes display of an image within a graphical user interface of a client device 102, wherein the image comprises a set of image properties that define a foreground portion of the image and a background portion of the image. For example, the image properties may be graphical properties of the image. The image may include a depiction of an object in the foreground or background portion of the image.

In some embodiments, the presentation module 302 causes display of the image at the client device 102 responsive to a request from the client device 102 to display the image. For example, a user of the client device 102 may provide an input that accesses the image from among an image repository (e.g., the database 120).

At operation 404, the presentation module 302 receives, from a user of the client device 102, a first input that selects or otherwise identifies a region within the foreground portion of the image via the graphical user interface presented at the client device 102. For example, the input may comprise a stroking gesture, similar to a paint brush, "painting" a region within the foreground portion of the image presented within the graphical user interface at the client device 102.

In some embodiments, the graphical user interface may include a menu to select an input type. For example, the input types may include a first input type that enables a user to define foreground portions of an image, and a second input type that enables the user to define the background portions of the image. The user may provide an input into the graphical user interface at the client device 102 to select an input type (e.g., the first input type), and then provide the first input to identify the region within foreground portion of the image.

At operation 406, the presentation module 302 receives a second input that identifies the background portion of the image. As discussed above with respect top operation 404, the input may include a stroking gesture that "paints" a portion of the image in order to identify the region within the background portion of the image.

At operation 408, the segmentation module 306 identifies a boundary of an object depicted in the image based on the first user input that identifies the foreground portion of the image and the second user input that identifies the background portion of the image, wherein the boundary comprises a set of dimensions.

In some embodiments, the identification of the boundary may be based on a progressive selection algorithm, wherein background and foreground color information is estimated based on the selected portions of the background and foreground as defined by the first user input and the second user input. For example, the image segmentation system 124 may first request that the user provides one or more inputs that identify the foreground portion of the image, and responsive to receiving the inputs that identify the foreground portion of the image, request one or more inputs to identify the background portion of the image.

For example, in some embodiments, responsive to receiving the first input that defines the foreground portion of the image, the segmentation module 306 randomly samples a number (e.g., 1200) pixels from the portion of the foreground defined by the first input. A color model of the foreground portion of the image is generated based on the pixels randomly selected from the portion of the foreground. A similar approach is applied to the background portion of the image, by randomly sampling a number of pixels from the portion defined by the second user input.

A multi-level graph cut based optimization is applied to the color model of the foreground portion of the image and the color model of the background portion of the image in order to identify the boundary of the object depicted in the image. In some embodiments, responsive to identifying the boundary of the object based on the color models, the segmentation module 306 causes display of a visual representation of the boundary of the object (e.g., an outline).

At operation 410, the segmentation module 306 crops the object from the image based on the boundary of the object, and at operation 412 generates a media item based on the cropped object, wherein the media item comprises media properties (e.g., a size and shape) based on the set of dimensions of the boundary of the object.

In some example embodiments, the media item can then be saved to a memory location associated with the user of the client device 102. For example, the memory location may be a local memory of the client device 102 or may also include the databases 120.

Figure 7:
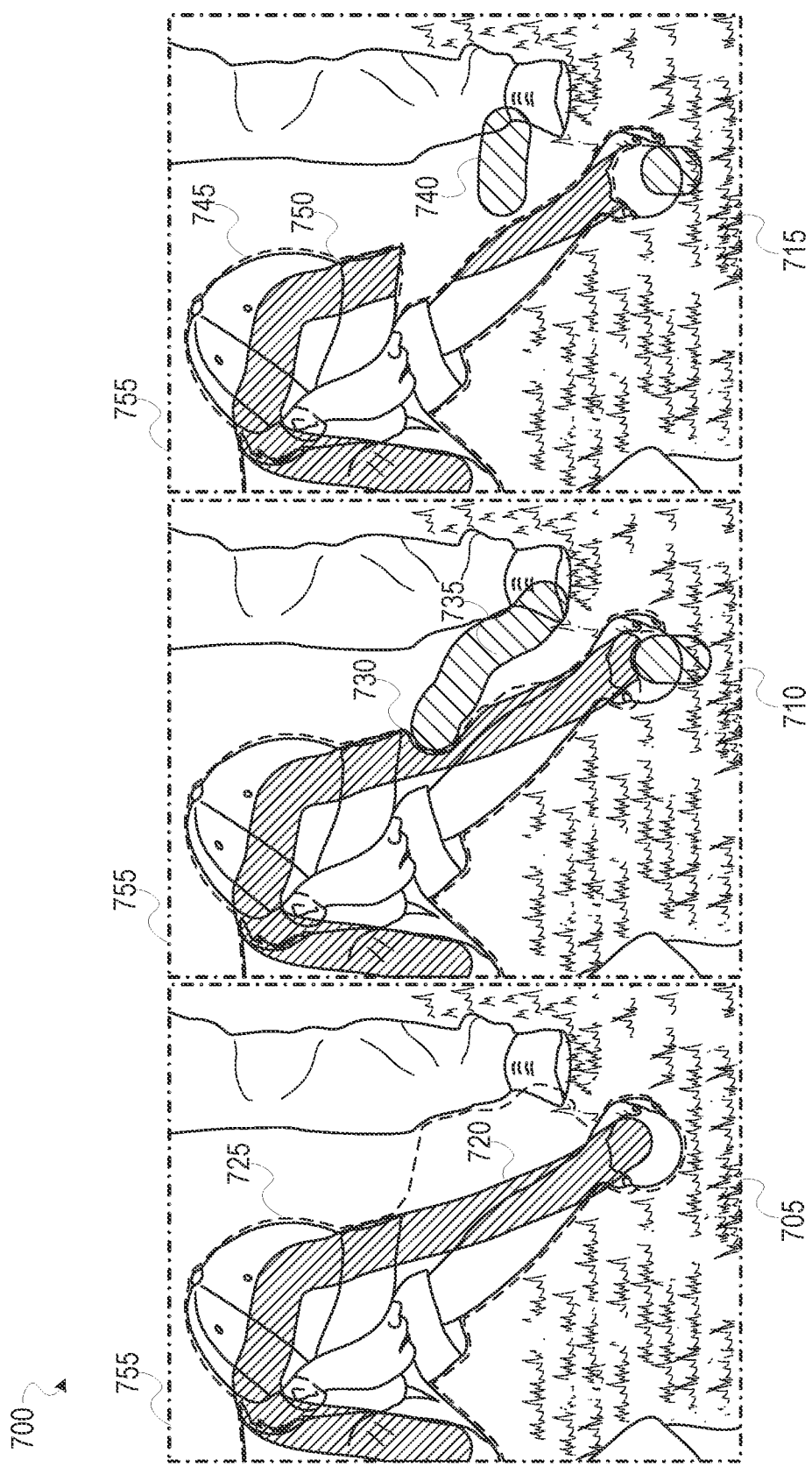
FIG. 7 is a flow-diagram depicting a method to segment an object from an image, according to certain example embodiments.

FIG. 5 is a flowchart depicting a method 500 segmenting an object from an image, according to certain example embodiments, and as depicted by the flow-diagram 700 of FIG. 7. Operations of the method 500 may be performed by the modules described above with respect to FIG. 3. As shown in FIG. 5, the method 500 includes one or more operations 502, 504, 506, and 508.

At operation 502, the segmentation module 306 detects a conflict between a first region of the image (as defined by the first user input to define the foreground of the image), and the second region (as defined by the second user input to define the background of the image). For example, as seen in FIG. 7, the conflict may include the overlap 730 between the first region 720 and the second region 735, wherein the overlap 730 comprises an intersection at a point within the image 755.

At operation 504, the segmentation module 306 segments the first region (e.g., the first region 720 of FIG. 7) into at least a first segment (e.g., the first segment 750 of FIG. 7) at the point of the intersection, wherein the first segment comprises at least a portion of the first region. Responsive to segmenting the first region into the first segment, in some embodiments the segmentation module 306 takes a random sampling of pixels within the first segment in order to generate a color model of the foreground of the image.

Similarly, at operation 506, the segmentation module 306 segments the second region into at least a second segment at the point of the intersection, wherein the second segment comprises at least a portion of the second region. Responsive to segmenting the second region into the second segment, the segmentation module 306 takes a random sampling of pixels within the second segment in order to generate a color model of the background of the image.

At operation 508, the segmentation module 306 identifies the boundary of the object depicted based on the first and second segments of the regions defined by the first and second inputs.

Figure 6:
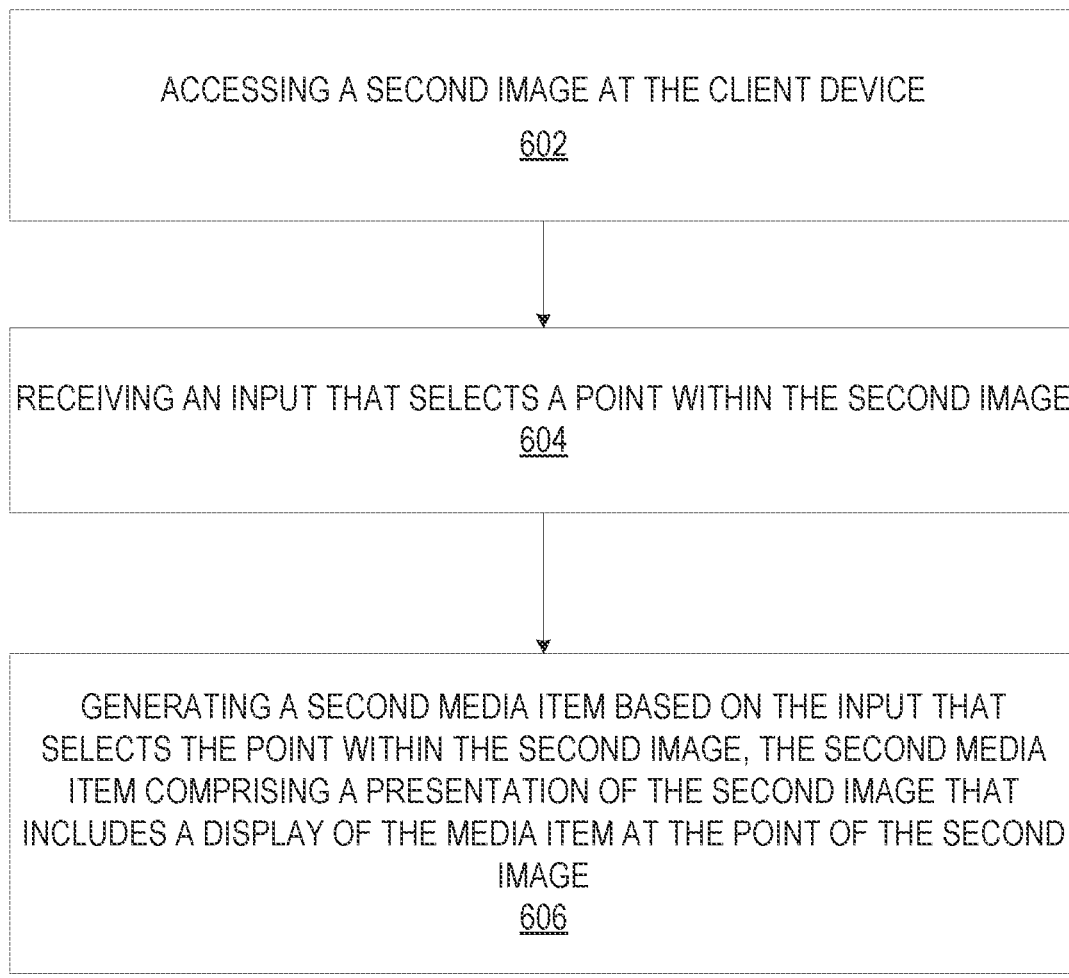
FIG. 6 is a flowchart depicting a method of generating media content, according to certain example embodiments.
Figure 8:
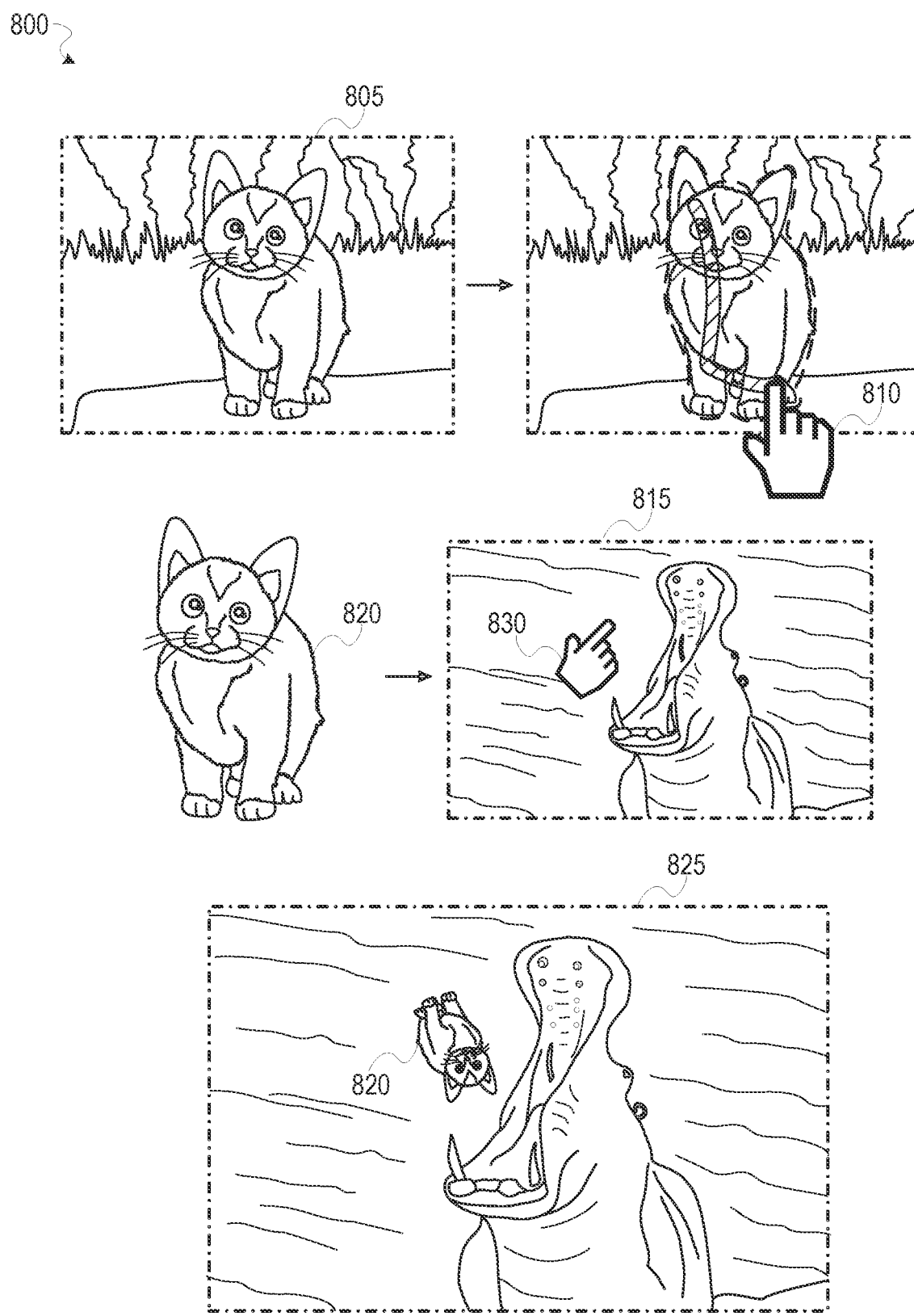
FIG. 8 is a flow-diagram depicting a method of generating media content, according to certain example embodiments.

FIG. 6 is a flowchart depicting a method 600 generating media content, according to certain example embodiments, and as depicted by the flow-diagram 800 of FIG. 8. Operations of the method 600 may be performed by the modules described above with respect to FIG. 3. As shown in FIG. 6, the method 600 includes one or more operations 602, 604, and 606.

At operation 602, the media module 302 accesses a second image at the client device 102. For example, in some embodiments, a user of the client device 102 may provide one or more input identifying, generating, or otherwise selecting a second image (e.g., the second image 815 depicted in FIG. 8).

At operation 604, the media module 304 receives an input that identifies a point within the second image. Responsive to receiving the input that identifies the point within the second image, at operation 606 the media module 304 positions a presentation of the media item generated in operation 410 of the method 400 (e.g., the media item 820 of FIG. 8) at the point identified by the user input within the second image.

FIG. 7 is a flow-diagram 700 depicting a method to segment an object from an image, according to certain example embodiments. As seen in FIG. 7, the flow-diagram 700 includes an image 755, a foreground region 720 of the image 755, defined by a first user input, and background region 735 of the image 755 defined by a second user input, as described in the methods 400 and 500 of FIGS. 4 and 5. Operations depicted by the flow-diagram 700 may be performed by the modules described above with respect to FIG. 3.

At operation 705, as discussed in operation 404 of the method 400 depicted in FIG. 4, a user provides a first input that defines a region 720 of the image 755. For example, the user may provide an input by dragging a cursor (or in the case of a touch-screen device, a tactile input dragging a finger or stylus) along a region as depicted by the foreground region 720 in FIG. 7. Responsive to receiving the input, the image segmentation system 124 causes display of a visual representation of the foreground region 720, such as the "scribble" seen in FIG. 7.

In some embodiments, responsive to receiving the input that identifies the foreground region 720, the segmentation module 306 performs operations that include sampling a random set of pixels within the foreground region 720, generating a color model that represent the foreground region 720, and identifies a boundary 725 of an object depicted in the image 755 based on the color model. The image segmentation system 124 may cause display of a visualization of the boundary 725. As seen in FIG. 7, the boundary 725 is represented as a dotted line.

At operation 710, responsive to receiving a user input that defines the background region 735, as described in operation 502 of the method 500, the segmentation module 306 detects the conflict 730 between the foreground region 720 and the background region 735, wherein the conflict 730 comprises an overlap between the foreground region 720 and the background region 735.

As described in operation 504 and 506 of the method 500, the segmentation module 306 segments the first region 720 into at least a first segment 750 at the point of the conflict 730, and segments the second region 735 into at least a second segment 740 at the point of the conflict 730. For example, as seen in operation 715 of FIG. 7, the overlapping portions of the foreground region 720 and the background region 735 are removed, such that the segmentation module 306 may re-sample a random set of pixels from within the first segment 750 and the second segment 740 in order to generate color models to identify the boundary.

As seen in operation 715, responsive to segmenting the foreground and background regions into the first segment 750 and the second segment 740, the segmentation module 306 applies the updated color models to identify the boundary 745.

FIG. 8 is a flow-diagram 800 depicting a method of generating media content, according to certain example embodiments. As seen in FIG. 8, the flow-diagram 800 includes a first image 805, an input 810 onto the first image 805, a media item 820, a second image 815, and a second media item 825, wherein the second media item 825 is generated based on the second image 815 and the media item 820.

As discussed in the method 600 of FIG. 6 above, the image segmentation system 124 detects the boundary of the object depicted in the image 805 based on the input 810. For example, the input 810 may define a region within the image 805 that corresponds with a foreground portion of the image 805.

Responsive to receiving the input 810, the image segmentation system 124 takes a random sampling of pixels within the region defined by the input 810 and generates a color model that represents the foreground portion of the image. Based on the color model, the image segmentation system 124 identifies the boundary of the object depicted in the image 805 and segments the object from the image 805 to generate the media item 820.

In some embodiments, responsive to generating the media item 820, the image segmentation system 124 stores the media item 820 at a memory location associated with a user of the client device (e.g., the database 120), such that the user may access the media item 820 at a later time.

As discussed in operation 602 of the method 600, a user of the client device 102 may access and cause display of a second image 815 at the client device 102, and provide an input 830 that selects a point within the second image 815.

Responsive to receiving the input 830 that selects the point within the second image 815, the media module 304 may retrieve the media item 820, and generate the second media item 825, by overlaying the media item 820 at a position within the image 815 based on the point selected by the input 830.

According to certain embodiments, the user of the client device 102 may then generate a message, such as an ephemeral message, to be distributed to one or more recipients, and which includes the second media item 825.

Software Architecture

Figure 9:
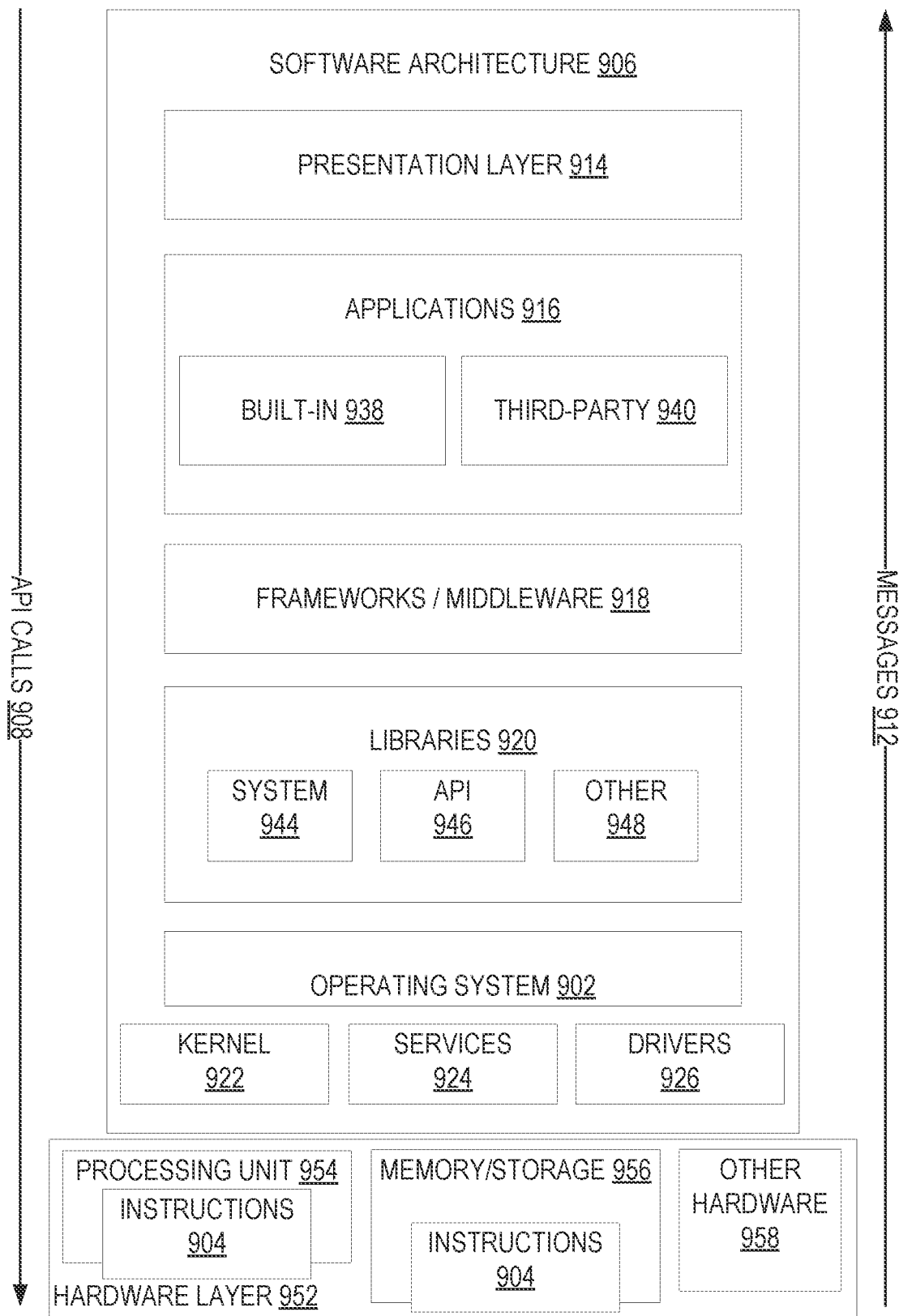
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
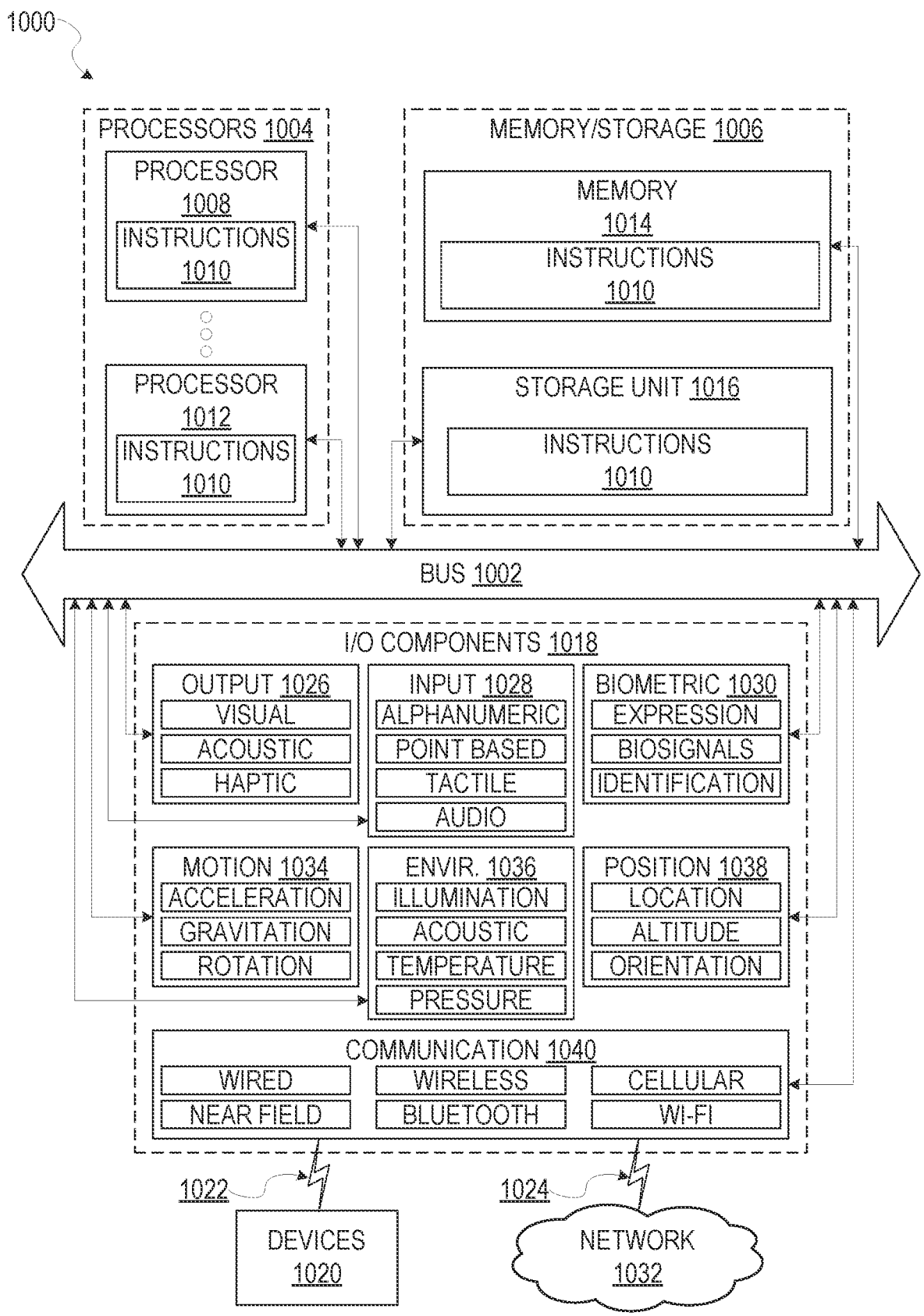
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLS™)" in this context refers to a recurrent neural network (RNN) architecture that remembers values over arbitrary intervals. Stored values are not modified as learning proceeds. RNNs allow forward and backward connections between neurons. BLS™ are well-suited for the classification, processing, and prediction of time series, given time lags of unknown size and duration between events.

What is claimed is:

1. A method comprising:
   causing display of an image within a graphical user interface at a client device, the image comprising a foreground and a background;
   receiving a first selection of a first input type from among a set of input types;
   receiving a first user input that identifies the foreground of the image based on the first input type, the foreground comprising a first set of pixels;
   receiving a second selection of a second input type from among the set of input types;
   receiving a second user input that identifies the background of the image based on the second input type, the background comprising a second set of pixels;
   identifying a boundary of an object depicted in the image based on the first set of pixels and the second set of pixels;
   cropping the object from the image based on the boundary of the object;
   generating a media item based on the object; and
   saving the media item at a memory location associated with a user of the client device.

2. The method of claim 1, wherein the memory location associated with the user of the client device includes a memory of the client device.

3. The method of claim 1, wherein the image is a first image, and the method further comprises:
   causing display of a second image at the client device;
   receiving a tactile input that identifies a position within the second image; and
   presenting the media item at the position within the second image at the client device.

4. The method of claim 3, further comprising:
   generating a second media item that comprises the media item at the position within the second image;
   attaching the second media item to an ephemeral message, the ephemeral message including message properties that include a display duration; and
   causing display of the second media item for a period of time based on the display duration.

5. The method of claim 1, wherein the first user input identifies the first set of pixels from the foreground portion of the image and the second user input identifies the second set of pixels from the background portion of the image.

6. The method of claim 1, wherein the identifying the boundary of the object depicted in the image based on the first set of pixels and the second set of pixels includes:
   detecting an intersection between a portion of the first set of pixels and the second set of pixels.

7. The method of claim 1, wherein the identifying the boundary of the object depicted in the image based on the first set of pixels n and the second set of pixels includes:
   generating a first color model that represents the foreground portion of the image based on the first set of pixels;
   generating a second color model that represents the background portion of the image based on the second set of pixels; and
   identifying the boundary of the object depicted in the images based on the first color model and the second color model.

8. A system comprising:
   a memory; and
   at least one hardware processor coupled to the memory and comprising instructions that causes the system to perform operations comprising:
   causing display of an image within a graphical user interface at a client device, the image comprising a foreground and a background;
   receiving a first selection of a first input type from among a set of input types;
   receiving a first user input that identifies the foreground of the image based on the first input type, the foreground comprising a first set of pixels;
   receiving a second selection of a second input type from among the set of input types;
   receiving a second user input that identifies the background of the image based on the second input type, the background comprising a second set of pixels;
   identifying a boundary of an object depicted in the image based on the first set of pixels and the second set of pixels;
   cropping the object from the image based on the boundary of the object;
   generating a media item based on the object; and
   saving the media item at a memory location associated with a user of the client device.

9. The system of claim 8, wherein the memory location associated with the user of the client device includes a memory of the client device.

10. The system of claim 8, wherein the image is a first image, and the operations further comprise:
    causing display of a second image at the client device;
    receiving a tactile input that identifies a position within the second image; and
    presenting the media item at the position within the second image at the client device.

11. The system of claim 10, further comprising:
    generating a second media item that comprises the media item at the position within the second image;
    attaching the second media item to an ephemeral message, the ephemeral message including message properties that include a display duration; and
    causing display of the second media item for a period of time based on the display duration.

12. The system of claim 8, wherein the first user input identifies the first set of pixels from the foreground portion of the image and the second user input identifies the second set of pixels from the background portion of the image.

13. The system of claim 8, wherein the identifying the boundary of the object depicted in the image based on the first set of pixels and the second set of pixels includes:
    detecting an intersection between a portion of the first set of pixels and the second set of pixels.

14. The system of claim 8, wherein the identifying the boundary of the object depicted in the image based on the first set of pixels n and the second set of pixels includes:
    generating a first color model that represents the foreground portion of the image based on the first set of pixels;
    generating a second color model that represents the background portion of the image based on the second set of pixels; and identifying the boundary of the object depicted in the images based on the first color model and the second color model.

15. A non-transitory machine-readable storage medium comprising instructions that, when executed by one or more processors of a machine, cause the machine to perform operations comprising:
   causing display of an image within a graphical user interface at a client device, the image comprising a foreground and a background;
   receiving a first selection of a first input type from among a set of input types;
   receiving a first user input that identifies the foreground of the image based on the first input type, the foreground comprising a first set of pixels;
   receiving a second selection of a second input type from among the set of input types;
   receiving a second user input that identifies the background of the image based on the second input type, the background comprising a second set of pixels;
   identifying a boundary of an object depicted in the image based on the first set of pixels and the second set of pixels;
   cropping the object from the image based on the boundary of the object;
   generating a media item based on the object; and
   saving the media item at a memory location associated with a user of the client device.

16. The non-transitory machine-readable storage medium of claim 15, wherein the memory location associated with the user of the client device includes a memory of the client device.

17. The non-transitory machine-readable storage medium of claim 15, wherein the image is a first image, and the operations further comprise:
   causing display of a second image at the client device;
   receiving a tactile input that identifies a position within the second image; and
   presenting the media item at the position within the second image at the client device.

18. The non-transitory machine-readable storage medium of claim 17, further comprising:
   generating a second media item that comprises the media item at the position within the second image;
   attaching the second media item to an ephemeral message, the ephemeral message including message properties that include a display duration; and
   causing display of the second media item for a period of time based on the display duration.

19. The non-transitory machine-readable storage medium of claim 15, wherein the first user input identifies the first set of pixels from the foreground portion of the image and the second user input identifies the second set of pixels from the background portion of the image.

20. The non-transitory machine-readable storage medium of claim 15, wherein the identifying the boundary of the object depicted in the image based on the first set of pixels and the second set of pixels includes:
   detecting an intersection between a portion of the first set of pixels and the second set of pixels.

* * * * *